United States Patent [19]

Mansfield

[11] Patent Number: 4,776,530
[45] Date of Patent: Oct. 11, 1988

[54] SAFETY APPARATUS FOR HANG GLIDER

[76] Inventor: Stephen M. Mansfield, Rte. 2, Owingsville, Ky. 40360

[21] Appl. No.: 91,403

[22] Filed: Aug. 31, 1987

[51] Int. Cl.$^4$ .................. B64D 47/00; B64C 31/02
[52] U.S. Cl. .................. 244/1 R; 244/904; 244/16; 340/540; 340/575
[58] Field of Search .................. 244/904, 901, 16, 3, 244/1 R; 340/575, 687, 52 E, 540, 573, 572, 686

[56] References Cited

U.S. PATENT DOCUMENTS

| 4,272,039 | 6/1981 | Hollingsworth | 244/904 |
| 4,688,022 | 8/1987 | Gray | 244/904 |

OTHER PUBLICATIONS

"The Mid-Year Accident Report" in *Hang Gliding*, Jul. 1987.
"1986 Accident Review" in *Hang Gliding*, Mar. 1987.
*Hang Gliding*, Illustrations in Apr. 1987 Issue, pp. 9 and 14.

*Primary Examiner*—Galen Barefoot
*Attorney, Agent, or Firm*—King and Schickli

[57] ABSTRACT

A safety apparatus for a hang glider that indicates any failure of a pilot to properly hook in a flight harness. The apparatus includes a circuit having a power source, such as a dry cell battery, connected to an alarm through a harness hook in sensor. When the pilot fails to properly hook in the harness, an alarm sounds. The circuit also includes an on/off switch that activates the circuit only in direct response to erection of the hang glider. Thus, the circuit is deactivated when the hang glider is disassembled for transport to or from a launch site and during storage. Consequently, annoying alarm soundings are avoided and battery life is increased. In addition, the circuit includes a deactivation switch that prevents the alarm from sounding when the hang glider is resting on the ground. Finally, a test switch is provided to allow manual testing to confirm proper activation and operation of the circuit.

10 Claims, 3 Drawing Sheets

SAFETY APPARATUS FOR HANG GLIDER

TECHNICAL FIELD

The present invention relates generally to the field of hang gliding and, more particularly, to a safety device that indicates when a pilot has failed to hook in a flight harness on a hang glider so that the condition may be corrected prior to launch.

BACKGROUND OF THE INVENTION

A hang glider is a lightweight, kite-like glider from which a harnessed pilot hangs while gliding down from a hill or cliff. A hang glider includes a sail that provides lift to the glider and pilot as the glider cuts through the air. The pilot wears a flight harness that is attached to the glider at a single, centralized "hang point". When the flight harness is properly hooked in, the pilot is held suspended beneath the sail with his hands resting on the glider control bar. The pilot manipulates the glider control bar to simply shift his weight relative to the hang point and thereby control the speed and direction of glider movement.

Hang gliding is an exhilirating sport that comes as close as is presently possible to allowing man to soar like a bird in free flight. Those who have experienced the phenomenon are left with a feeling of awe. The senses are simply overwhelmed as the air brushes over your face and plays against the sail of the glider while the ground rushes by below. There is simultaneously experienced both a sense of total peace and excitement. It is these abstract qualities that probably best explain the ever increasing popularity of the sport.

While the number of hang gliding enthusiasts continues to grow, it must not be overlooked that there is a dark side to the sport. Hang gliding is an inherently dangerous activity. There are a number of ways in which a hang glider pilot may be injured or even killed. One of the primary ways is the failure of the pilot to remember to hook in his flight harness on the hang glider prior to launch.

When a pilot fails to properly hook in, the pilot simply cannot hold onto or control the hang glider after launch. The problem is particularly critical where the pilot is launching from a cliff. There is no room for error during such a launch and a failure to properly hook in would likely cause serious injury or even death.

Up to the present point in time, the only way to avoid a failure to properly hook in was for the pilot to develop his or her own habit pattern. Typically such a pattern includes a "hang check". The pilot conducts a hang check by attempting to hang under the sail of the glider before lifting the glider from the ground for launch. When properly hooked in, the pilot is suspended with his weight supported by the flight harness attached to the glider at the hang point. If not properly hooked in, the pilot conducting a hang check simply drops to the ground. When this occurs, the pilot is, of course, alerted to the fact that he is not properly hooked in. The pilot can then proceed to hook in his harness prior to launch.

The problem with relying on such a habit pattern is, of course, obvious. There are many distractions that could break the pattern. For example, wind conditions may be fluctuating and thereby divert the pilot's attention. The pilot may also be closely watching other gliders in flight in the launch area and forget not only to properly hook in but also to conduct a hang check to verify this condition.

The risk that a distraction may break the habit pattern is simply not acceptable given the severe consequences of a failure to properly hook in. This is particularly true when it is realized that the problem of failure to hook in is totally preventable. A need, therefore, is identified for an apparatus to improve the safety of hang gliding by eliminating this statistically significant cause of hang gliding accidents.

SUMMARY OF THE INVENTION

Accordingly, it is a primary object of the present invention to provide a simple and inexpensive apparatus for improving the safety of a hang glider.

Another object of the present invention is the provision of a safety apparatus for indicating the failure of a pilot to hook in a flight harness on a hang glider prior to launch.

Yet another object of the present invention is to provide a hang glider safety apparatus that is automatically activated upon erection of the hang glider so as to eliminate the need to remember to actuate the safety system.

Still another object of the present invention is the provision of a safety apparatus for a hang glider that is both lightweight and compact and may be retrofitted to existing hang gliders to improve their safety without adversely affecting their handling.

Still another object of the present invention is the provision of a hang glider safety apparatus that sounds an alarm when the flight harness is not hooked in as the pilot lifts the hang glider from the ground for launch.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a safety apparatus is provided for indicating failure of a pilot to hook in a flight harness on a hang glider. The apparatus includes a circuit having a power source, a harness hook in sensing means and an alarm means. The power source is connected to the alarm through the harness hook in sensor. Thus, an alarm sounds only when the pilot fails to properly hook in the flight harness on the hang glider. Advantageously, the sounding of the alarm warns the pilot that the harness is not properly hooked in prior to launch. In this way, this potentially dangerous condition can be corrected and the launching of the hang glider by a pilot who is not hooked in is prevented. Thus, this statistically significant cause of hang gliding accidents is avoided.

The circuit may also include an on/off switch. Preferably, the on/off switch is mounted to a frame member of the hang glider so that the circuit and thereby the apparatus is activated in direct response to erection of the hang glider. Advantageously, automatic activation eliminates the possibility of the pilot forgetting to activate the safety device.

In accordance with a further aspect of the present invention, the circuit may also include a means for deactivating the alarm when the erected hang glider is at rest on the ground. The deactivating means, like the harness hook-in sensor may be a pressure sensitive limit switch. Preferably, the limit switch is mounted to the bottom face of the control bar of the hang glider. Thus, when the glider is at rest on the ground, the weight of the glider rests on the limit switch disposed between the bottom surface of the control bar and the ground. This serves to trip the switch and open the circuit thereby preventing the activation of the alarm. Thus, annoying and unnecessary alarm soundings are avoided without actually turning off the apparatus. Consequently, the possibility of the pilot forgetting to reactivate the apparatus prior to launch is eliminated.

Once the glider is raised from the ground, the limit switch is biased so as to return to its normally closed position. Thus, the circuit is completed between the harness hook in sensor and the alarm. In the event the harness has been properly hooked in, the limit switch of the harness hook in sensor is opened and, therefore, no alarm sounds. Where, however, the harness has not been properly hooked in, the limit switch of the harness hook in sensor remains closed completing the entire circuit and sounding the alarm.

It should be recognized that many hang gliders for beginners include wheels on the control bar that prevent the bottom surface of the control bar from engaging the ground. A means for deactivating the circuit may, however, still be provided on such a glider. More specifically, a limit switch as described above, may be mounted to the noseplate and another to the tail of the hang glider. When a hang glider is resting on the ground, either the noseplate or tail is contacting the ground. Thus, these switches operate in the same manner as the deactivation switch attached to the control bar described above.

In accordance with still another aspect of the present invention the circuit may include a test switch. When activated by the pilot, the test switch closes the circuit directly between the power source and the alarm. Thus, the test switch allows the pilot to very simply verify activation and proper operation of the safety apparatus.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
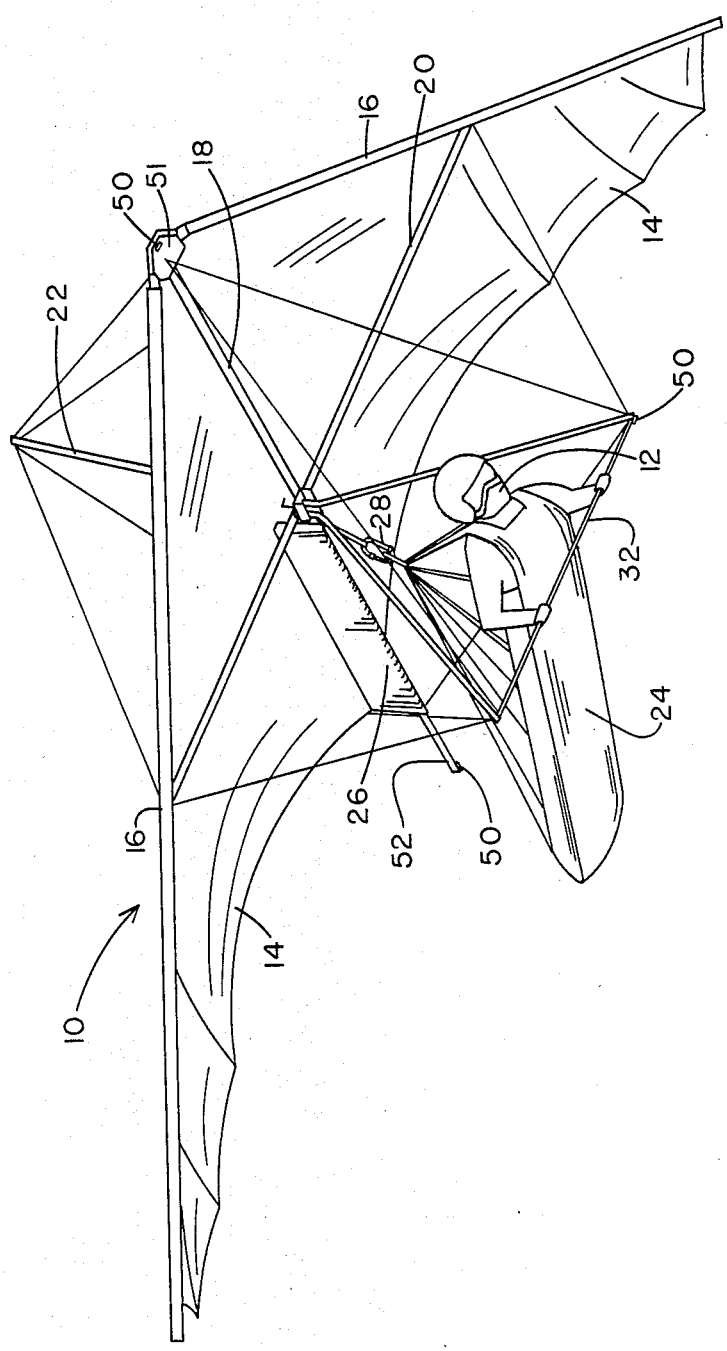
FIG. 1 is a perspective view of a pilot and hang glider in flight.

Reference is now made to FIG. 1 showing a hang glider 10 in flight under the control of a pilot 12. As is known in the art, the hang glider 10 includes a sail 14 stretched between leading edge members 16 of a lightweight, tubular framework including a keel 18, crossbar 20 and king post 22. As the hang glider 10 cuts through the air, the sail 14 fills to form an air foil that directs air so as to provide lift to the glider and pilot 12.

As shown, the pilot 12 is suspended beneath the sail 14 of the glider 10 by means of a flight harness 24. The flight harness 24 is attached to the glider 10 at a single hang point by means of a carabiner 26. More specifically, the carabiner 26 is attached to a carabiner 28 that is mounted to the distal end of a webbing strap 30 (see also FIG. 2). The opposite end of the webbing strap 30 is fixed to the keel 18 of the glider 10.

When a pilot 12 is properly hooked in as shown in FIG. 1, he is suspended beneath the sail 14 from the hang point. In this position, the pilot 12 can shift his weight relative to the hang point by grasping and either pulling or pushing one or both sides of the control bar 32. For example, if the pilot 12 shifts his weight to the left, the glider 10 turns to the left. As a further example, if the pilot 12 shifts his weight forward, the hang glider 10 dives. Thus, it should be appreciated that by shifting his weight, the pilot 12 is able to control both the speed and direction of glider movement.

When a pilot 12 fails to properly hook in, it is the connection between the carabiner 26 at the end of the harness 24 and the carabiner 28 attached to the glider 10 that is not made. In the event a pilot 12 launches his glider 10 without hooking in, he is neither in a position to hold onto nor control the glider. In such a situation a crash occurs possibly resulting in serious injury or even death. This is particularly true in mountainous areas where a pilot 12 may leap from a cliff at launch.

The apparatus of the present invention is designed to warn the pilot 12 prior to launch when he has failed to properly hook in so that the condition may be corrected. In this way, the present apparatus reduces the risk of launch accidents thereby improving the safety of this inherently dangerous sport.

Figure 4:
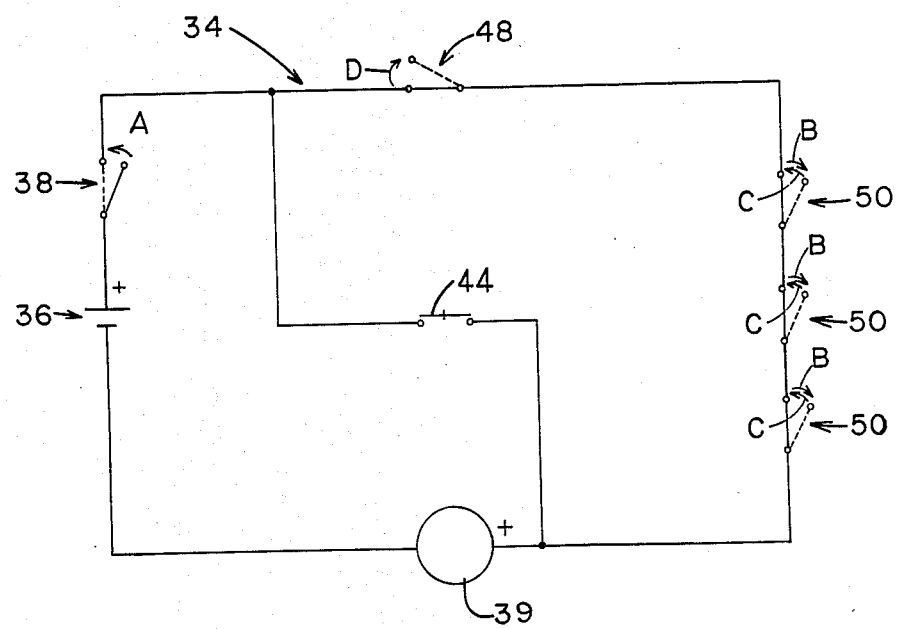
FIG. 4 is a schematic circuit diagram of the safety apparatus of the present invention.

The safety apparatus of the present invention includes a control circuit, generally designated by reference numeral 34, shown schematically in FIG. 4. The circuit 34 includes a power source 36, such as a nine volt dry cell battery. This battery 36 may, for example, be mounted to the glider 10 along the keel tube 18 as shown in FIG. 2.

The battery 36 is connected through a on/off switch 38 to an alarm 39 (see also FIG. 4). As is known in the art, a hang glider 10 may be disassembled in a relatively simple manner into a more compact form to allow easier handling during transportation to and from a launch site. Preferably, the on/off switch 38 is designed to deactivate the safety apparatus of the present invention when the hang glider 10 is disassembled and activate the safety apparatus only when the hang glider is assembled as is necessary for launch.

Figure 2:
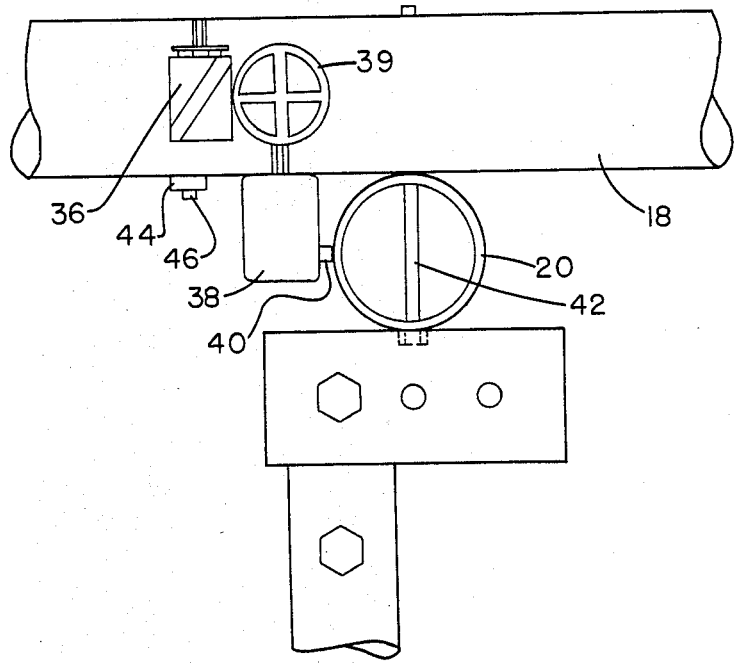
FIG. 2 is a detailed side elevational schematic view showing certain aspects of the circuit of the safety apparatus of the present invention.

This may be achieved by mounting the normally open on/off switch 38 to the keel 18 as shown in FIG. 2. More specifically, the actuator button 40 of the on/off switch is positioned so as to be engaged by the cross bar when the cross bar 20 is locked into place along the keel 18 utilizing the heart bolt 42. This serves to close the switch 38 and complete the circuit 34 (Note action arrow A).

It should be appreciated that the on/off switch 38, as described above, provides a number of distinct advantages. Since the safety apparatus is always deactivated when the hang glider 10 is disassembled, annoying and unnecessary alarms as is otherwise might be expected during handling, transportation and storage of the glider, are avoided. By eliminating these false alarms, the service life of the battery 36 is also extended. In addition, the automatic activation of the safety apparatus only when the glider 10 is erected for launch eliminates the possibility of the pilot becoming distracted during pre-launch setup of the glider 10 and forgetting to activate the apparatus. Of course, this is a very important feature of the present invention since this particular cause of possible failure of the safety apparatus to operate is fully avoided.

As also shown in FIGS. 2 and 4, the circuit 34 is also designed to include a test switch 44. Whenever a pilot 12 wishes to verify that the safety apparatus is operational, the pilot need only push the test switch actuator button 46. when the button 46 is pushed, the test switch 44 closes the circuit between the battery 36 and the alarm 39 which is thereby activated.

The battery 36 is also connected through a harness hook in sensor 48 mounted on the carabiner 28 and one or more deactivating switches 50 to the alarm 39. The sensor 48 and deactivating switches 50 operate together to activate the alarm 39 only in response to two simultaneously existing conditions. In effect, the circuit is only closed and an alarm is only sounded when (1) the assembled glider 10 is raised from the ground as in preparation for launch and (2) a flight harness 24 is not hooked into the carabiner 28.

Both the hook in sensor 48 and deactivating switches 50 may comprise normally closed, pressure sensing limit switches responsive to moderately light pressure (i.e. 2-4 ounces). The deactivating switches 50 may be mounted to the glider 10 on the bottom surface of the control bar 32, on the bottom face of the noseplate 51 and/or on the bottom face of the tail 52 (see FIG. 1). When the glider 10 is positioned at rest on the ground, one or more of these points contacts the ground. Thus, the weight of the glider 10 is applied to the interdisposed deactivating switch or switches 50. This serves to trip the levers (not shown) of the deactivating switches 50 so as to open the normally closed switches (note action arrows B in FIG. 4) and prevent deactivation of the alarm 39. In this manner, the circuit 34 is automatically deactivated when the glider 10 is at rest on the ground. Thus, the pilot 12 need not turn off the safety apparatus to prevent annoying and unnecessary alarms.

As a further advantage, it should be appreciated that when the pilot 12 lifts the glider 10 from the ground (as is necessary to launch), the circuit 34 is automatically reactivated. Thus, there is no responsibility placed on the pilot 12 to remember to turn on the safety apparatus. More specifically, when the glider 10 is lifted from the ground, all weight is removed from the switches 50. Consequently, the switches 50 return to their normally closed position (see action arrow C in FIG. 4) to complete the circuit between the battery 36, the hook sensor 38 and the alarm 39.

When a pilot 12 that is not properly hooked in raises the glider 10 for launch, the circuit 34 is fully closed and the alarm 39 sounds. The resulting buzz or beep of the alarm 39 alerts the pilot that he still must hook in. Once the pilot 12 hooks the harness carabiner 26 into the carabiner 28, the alarm is deenergized by the opening of the switch of the hook in sensor 48 (note action arrow D in FIG. 4).

Figure 3:
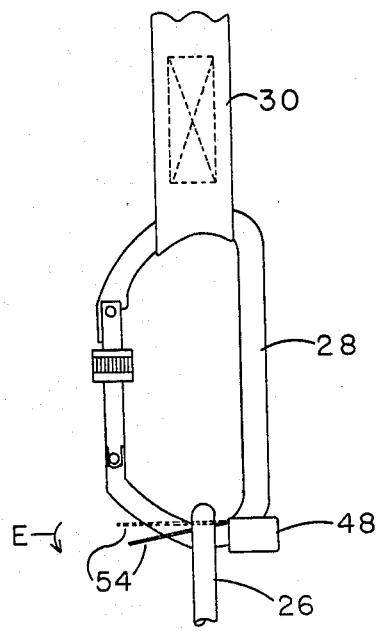
FIG. 3 is a detailed schematic view to show the harness hook in sensor of the apparatus.

More specifically, when a pilot 12 is not properly hooked in, the trip lever 54 of the hook in sensor 48 is not weighted. Thus, the switch 48 remains in the normally closed position completing the circuit 34 and thereby causing the alarm 39 to sound. In contrast, when the pilot 12 hooks in properly, the weight of the harness 24 and carabiner 26 pulls the trip lever 54 of the hook in sensor 48 downwardly (note action arrow E in FIG. 3) from the dash line to the full line position. This serves to open the switch 4 thereby preventing the alarm 39 from sounding.

In summary, numerous benefits have been described which result from employing the concepts of the present invention. Advantageously, the apparatus of the present invention substantially eliminates the possibility of a pilot 12 failing to properly hook in his flight harness 24 to a hang glider 10. By eliminating this potential cause of injuries and/or deaths, the safety of the hang gliding sport is greatly increased. Further, since the apparatus is both compact and lightweight, it may be easily added to existing hang gliders without adversely affecting their handling.

The apparatus also includes a number of additional features providing further advantages of substantial import. The on/off switch 38 is designed for automatic operation. When the hang glider 10 is disassembled, the safety apparatus is deenergized. This serves to not only save the power supply but prevents annoying and unnecessary alarm soundings. Conversely, when the hang glider 10 is erected for flight, the safety apparatus is automatically activated. This automatic activation serves to eliminate the possibility of the pilot forgetting to activate the safety apparatus.

The safety apparatus also includes a hook in sensor or switch 48 and a series of deactivating switches 50 that, advantageously, only allow the activation of the alarm when the glider 10 is raised from the ground as in preparation for launch and a flight harness 24 is not hooked into the carabiner 28. In this manner, the sounding of false alarms is minimized to provide maximum operational integrity to the system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A safety apparatus for indicating failure of a pilot to hook in a flight harness on a hang glider, comprising:
   circuit means including a power source, on/off switch means mounted to said glider for activating said circuit means in direct response to erection of said hand glider, a harness hook in sensing means and an alarm means, said power source being connected to said alarm means through said harness hook in sensing means so that an alarm sounds when thepilot fails to properly hook in the flight harness on the hang glider.

2. The hang glider safety apparatus of claim 1, wherein said harness hook in sensing means is a pressure sensing limit switch responsive to the weight of the flight harness when properly hooked into the hang glider.

3. The hang glider safety apparatus of claim 1, wherein said circuit means further includes a means for deactivating said alarm means when said erected hang glider is at rest on the ground.

4. The hang glider safety apparatus of claim 3, wherein said deactivating means is a pressure sensitive limit switch responsive to the weight of the hang glider resting on the ground.

5. The hang glider safety apparatus of claim 3, wherein said deactivating means is mounted to a nose of the hang glider.

6. The hang glider safety apparatus of claim 3, wherein said deactivating means is mounted to a tail of the hang glider.

7. The hang glider safety apparatus of claim 3, wherein said deactivating means is mounted to a control bar of the hang glider.

8. The hang glider safety apparatus of claim 1, wherein said circuit means further includes a test switch for testing said power souce and alarm means so as to ensure activation and proper operation of said circuit means.

9. A safety apparatus for indicating failure of a pilot to hook in a flight harness on a hang glider, comprising:
   circuit means including a power source, a harness hook in sensing means and an alarm means, said power source being connected to said alarm means through said harness hook in sensing means so that an alarm sounds when the pilot fails to properly hook in the flight harness to the hang glider; said circuit means further including an on/off switch to activate said circuit means in response to erection of said hang glider and a ground sensing means for deactivating said alarm means when hang glider is at rest on the ground.

10. A safety apparatus for indicating failure of a pilot to hook in a flight harness on a hang glider, comprising:
    circuit means including a power source, a harness hook in sensing means, an alarm means, and ground sensing means for deactivating said alarm means when said hang glider is at rest on the ground; said power source being connected to said alarm means through said harness hook in sensing means so that an alarm sounds when the pilot lifts the hang glider from the ground and fails to properly hook in the flight harness to the hang glider.

* * * * *